US011511749B2

(12) United States Patent
Kretschmann et al.

(10) Patent No.: US 11,511,749 B2
(45) Date of Patent: Nov. 29, 2022

(54) METHOD FOR OPERATING A MOTOR VEHICLE AND A MOTOR VEHICLE

(71) Applicant: AUDI AG, Ingolstadt (DE)

(72) Inventors: Philipp Kretschmann, Manching (DE); Saskia Kain, Berlin (DE)

(73) Assignee: Audi AG, Ingolstadt (DE)

( * ) Notice: Subject to any disclaimer, the term of this patent is extended or adjusted under 35 U.S.C. 154(b) by 111 days.

(21) Appl. No.: 16/604,382

(22) PCT Filed: Mar. 29, 2018

(86) PCT No.: PCT/EP2018/058082
§ 371 (c)(1),
(2) Date: Oct. 10, 2019

(87) PCT Pub. No.: WO2018/215121
PCT Pub. Date: Nov. 29, 2018

(65) Prior Publication Data
US 2020/0156641 A1 May 21, 2020

(30) Foreign Application Priority Data
May 22, 2017 (DE) .......................... 102017208646.7

(51) Int. Cl.
*B60W 30/00* (2006.01)
*B60W 30/18* (2012.01)
(Continued)

(52) U.S. Cl.
CPC ...... *B60W 30/18109* (2013.01); *B60W 10/18* (2013.01); *B60W 10/30* (2013.01);
(Continued)

(58) Field of Classification Search
CPC ........... B60W 30/18109; B60W 10/18; B60W 10/30; B60W 30/06; B60W 50/10; B60W 2555/60; B60W 2710/18; G05D 1/0088
See application file for complete search history.

(56) References Cited

U.S. PATENT DOCUMENTS 8,936,531 B2 1/2015 Sangameswaran et al.
9,227,631 B2 1/2016 Kammel et al.
(Continued)

FOREIGN PATENT DOCUMENTS

CN 104136260 A 11/2014
CN 105473408 A 4/2016
(Continued)

OTHER PUBLICATIONS

International Preliminary Report on Patentability directed to related International Patent Application No. PCT/EP2018/058082, dated Nov. 26, 2019, with attached English-language translation; 15 pages.
(Continued)

*Primary Examiner* — Truc M Do
(74) *Attorney, Agent, or Firm* — Sterne, Kessler, Goldstein & Fox P.L.L.C.

(57) ABSTRACT

To provide stopping assistance, the disclosure relates to a method for operating a motor vehicle, in which a stopping point for the motor vehicle is determined using a sensor device of the motor vehicle. In the method, the motor vehicle determines a need to stop at the stopping point and initiates stopping of the motor vehicle at the stopping point when the need is present. If the need is absent, a control device of the motor vehicle performs a movement of the motor vehicle or issues a message characterizing the absence of the need to a driver of the motor vehicle. The disclosure further relates to a motor vehicle.

16 Claims, 1 Drawing Sheet

(51) Int. Cl.
  *B60W 10/18*   (2012.01)
  *B60W 10/30*   (2006.01)
  *B60W 30/06*   (2006.01)
  *B60W 50/10*   (2012.01)
  *G05D 1/00*   (2006.01)

(52) U.S. Cl.
  CPC ............ *B60W 30/06* (2013.01); *B60W 50/10* (2013.01); *B60W 2555/60* (2020.02); *B60W 2710/18* (2013.01); *G05D 1/0088* (2013.01)

(56) References Cited

U.S. PATENT DOCUMENTS

| | | | |
|---|---|---|---|
| 9,873,427 | B2 | 1/2018 | Danzl et al. |
| 2010/0060482 | A1 | 3/2010 | Emam et al. |
| 2015/0158486 | A1* | 6/2015 | Healey .................. B60W 30/12 701/23 |
| 2017/0039850 | A1* | 2/2017 | Vanden Berg ... G08G 1/096725 |
| 2017/0301237 | A1* | 10/2017 | MacNeille .......... H04W 68/005 |
| 2017/0334380 | A1 | 11/2017 | Bonnet et al. |
| 2017/0350360 | A1* | 12/2017 | Tedesco .................. B60R 11/04 |
| 2018/0012492 | A1* | 1/2018 | Baldwin .................. B60T 7/00 |
| 2018/0113457 | A1* | 4/2018 | Iagnemma ............ B60W 30/06 |

FOREIGN PATENT DOCUMENTS

| | | |
|---|---|---|
| DE | 102010030208 A1 | 12/2011 |
| DE | 102010063006 A1 | 6/2012 |
| DE | 102011115670 A1 | 3/2013 |
| DE | 102011087791 A1 | 6/2013 |
| DE | 102011121487 A1 | 6/2013 |
| DE | 102013005362 A1 | 10/2013 |
| DE | 102014203104 A1 | 8/2014 |
| DE | 102014206901 A1 | 10/2015 |
| DE | 102015204122 A1 | 11/2015 |
| DE | 102014216269 A1 | 2/2016 |
| DE | 102014018189 A1 | 6/2016 |
| DE | 102014224124 A1 | 6/2016 |
| EP | 3121085 A1 | 1/2017 |
| GB | 2486559 A | 6/2012 |
| WO | WO-2011/157556 A1 | 12/2011 |

OTHER PUBLICATIONS

International Search Report and Written Opinion of the International Searching Authority directed to related International Patent Application No. PCT/EP2018/058082, dated Jul. 12, 2018, with attached English-language translation; 20 pages.

* cited by examiner

METHOD FOR OPERATING A MOTOR VEHICLE AND A MOTOR VEHICLE

TECHNICAL FIELD

The invention relates to a method for operating a motor vehicle and a motor vehicle according to the independent claims.

BACKGROUND

A method for operating a motor vehicle is already known from DE 10 2011 087 791 A1. This method serves to detect a situation in which a driver of the motor vehicle wants to perform a manual action with respect to an object outside the motor vehicle. Furthermore, the method supports alignment of the motor vehicle with respect to the object. For this purpose, by means of a sensor device of the motor vehicle, an aiming point is determined for the vehicle with respect to the object, which can be a parking ticket machine.

From DE 10 2014 018 189 A1 a method is known for operating a vehicle in a parking situation. In this method, it is determined whether the vehicle is in a predetermined parking situation, wherein a predetermined, vehicle-specific or parking situation-specific function is offered to a vehicle user or is automatically activated, the function being associated with the predetermined parking situation, when the vehicle is in the predetermined parking situation.

Finally, DE 10 2014 206 901 A1 discloses a method for assisting a driver of a vehicle in maneuver situations. In this case, the vehicle comprises means for situation detection, by means of which a situation and a position of the vehicle can be recognized, and according to which the driver is to be offered assistance in maneuvering. Then, according to the situation, different maneuvering options are created, prioritized and output to the driver of the vehicle for selection.

DE 10 2015 204 122 A1 also discloses a communication device of a vehicle, by means of which traffic light phase information can be retrieved from a traffic light. On the basis of this traffic light phase information and vehicle information, such as a speed of the vehicle and the distance to a stopping line, it is determined whether the vehicle must stop in front of the stop line or whether it can drive through the light stopping.

Moreover, DE 10 2010 063 006 A1 discloses a method for operating a driver assistance system of a vehicle. In the method, an image of an area in front of the vehicle is recorded by means of a frontal camera, and is evaluated for the presence of a stopping line. Furthermore, based on the evaluation, a selective triggering of an automatic response of the driver assistance system for precisely stopping at the stopping line.

Furthermore, a method for analyzing a traffic situation is known from DE 10 2013 005 362 A1. In the method, a camera detects a road marking of a stopping line and determines the distance between it and the current position of a vehicle. Moreover, an expected virtual state of a respective traffic light system is determined at the time when the vehicle enters a road intersection. This virtual state of the traffic light system is then output visually and/or acoustically and/or haptically within the vehicle to the driver in support of his planning the onward journey when crossing the intersection.

BRIEF DESCRIPTION OF THE DRAWINGS/FIGURES

DETAILED DESCRIPTION

Figure 1:
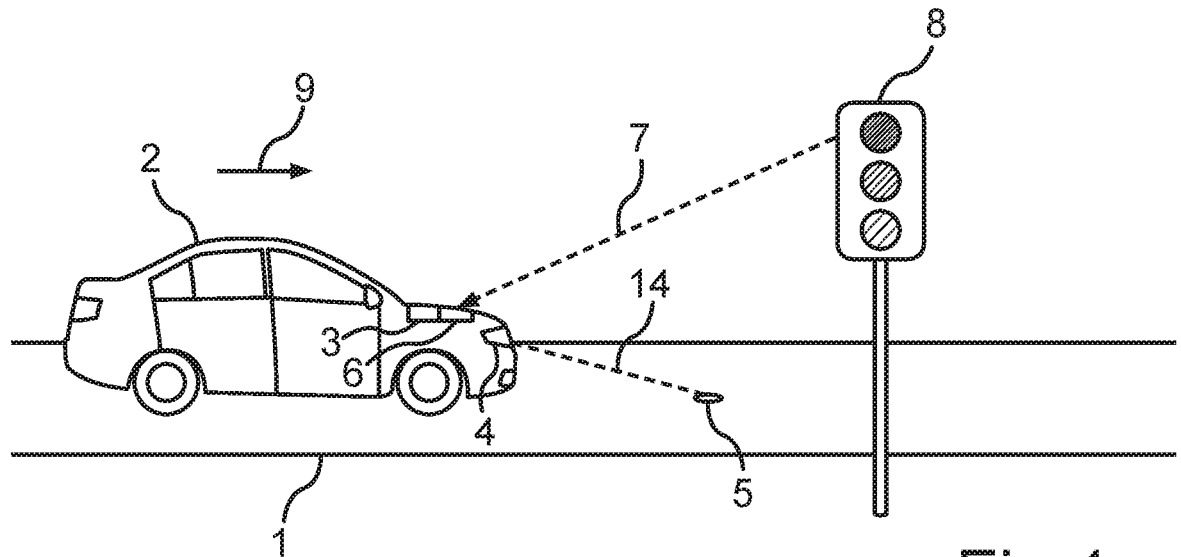
FIG. 1 illustrates a schematic side view of a motor vehicle, which determines a stopping point for the motor vehicle using a sensor device, according to some embodiments of this disclosure.

The object of the present invention is to provide a method for operating a motor vehicle as well as a motor vehicle, the method assisting the driver of the motor vehicle with respect to time-dependent stopping points.

This object is achieved by a method for operating a motor vehicle and by a motor vehicle having the features of the independent claims. Advantageous embodiments with expedient developments of the invention are disclosed in the respective dependent claims and in the following description.

To provide a method for operating a motor vehicle of the aforementioned type, by means of which the driver of the motor vehicle is supported particularly advantageously during maneuvering in relation to time-dependent stopping points, it is provided that the motor vehicle determines a need to stop at the stopping point. If the need is present, the motor vehicle causes the motor vehicle to stop at the stopping point. If the need is absent, a control device of the motor vehicle carries out a movement of the motor vehicle or issues a message to the driver of the motor vehicle characterizing the absence of the need. In other words, the motor vehicle determines the need to stop at the stopping point, which in particular is time-dependent, and if the need is present, causes the motor vehicle to stop by braking using the control device or by outputting a braking signal to the driver of the motor vehicle. If there is no need for the motor vehicle to stop at the stopping point or if there is no longer any need, then the control device can carry out a corresponding movement of the motor vehicle or can output the message characterizing the absence of the need to the driver of the motor vehicle. It is irrelevant whether the motor vehicle is approaching the stopping point when there is no need to stop, or whether the motor vehicle has stopped at the stopping point due to a premature need and there is no further need to stop at the stopping point. Thus, in an advantageous manner the driver of the motor vehicle can be assisted in maneuvering with respect to the stopping point, wherein the need can persist only temporarily at the stopping point for the motor vehicle and there can temporarily be no need for the motor vehicle to stop.

In this case, it is provided according to the invention that the motor vehicle exchanges driving information with at least one other motor vehicle and determines the stopping point as a function of the driving information. This is particularly relevant when a plurality of motor vehicles intend to stop at the stopping point. By exchanging the driving information between the motor vehicles, stopping operations of the motor vehicles can be coordinated with each other. For example, the coordination can be done based on a chronological order of the respective stoppings of the motor vehicles at the stopping point. Alternatively or additionally, the coordination with respect to a distribution of the motor vehicles to different stopping points located within a defined perimeter can be done. It is also possible for proposals to be made to the driver of the motor vehicle for a plurality of different possible scenarios as part of the coordination, the driver being able to select a scenario for execution by means of an input. For example, by means of coordination a particularly advantageous temporal efficiency can be achieved so that the stopping process of the motor vehicles, for example at a parking ticket machine for drawing a parking ticket, can take very little time.

In an advantageous embodiment of the invention, it is provided that the control device maneuvers the motor vehicle to the stopping point when necessary and keeps it at the stopping point. In other words, the control device assumes control of the motor vehicle if necessary so that the driver does not have to manually control the motor vehicle, for example when there is the need during an autonomous driving mode. This results in a particularly low risk of an accident since the motor vehicle recognizes the need to stop at the stopping point and the control device executes a steering to the stopping point as well as the stopping of the motor vehicle.

In this context, it has proven to be advantageous if the motor vehicle receives stopping information from a traffic infrastructure component and determines the stopping point in dependence on the stopping information and/or determines the need to stop at the stopping point. This means that the motor vehicle receives the stopping information, for example information characterizing the need to stop at the stopping point, from the traffic infrastructure component, which may be a traffic light, for example. If the stopping information includes, for example, that the traffic light emits a red light time, then the motor vehicle can determine from the light the fact that the need to stop at the stopping point is present. Advantageously, this may alert the driver of the motor vehicle to the need to stop at the stopping point, or to alert him that it is not necessary to stop at the stopping point. Also, a corresponding driving maneuver can be performed by the control device of the motor vehicle so that the driver of the motor vehicle is assisted in guiding the motor vehicle.

Preferably, depending on the stopping information, the motor vehicle determines a time and duration required for there to be a need and outputs it to the driver. In other words, the traffic infrastructure component transmits the stopping information to the motor vehicle, the stopping information characterizing the time and duration for the presence of the need. Alternatively, the traffic infrastructure component may be a barrier device at a train crossing, wherein the stopping information transmitted by the barrier device characterizes whether, when and how long it takes for a train to pass the train crossing, for example. Consequently, the motor vehicle can determine whether, from when and how long the need to stop at the stopping point is present for the motor vehicle. This makes it possible for the driver of the motor vehicle, when the necessity disappears after the end of the period, to be notified that the need to stop at the stopping point is no longer present, and/or for the control device of the motor vehicle to carry out the movement of the motor vehicle, in particular the motor vehicle passing through the stopping point.

In an advantageous embodiment of the invention, it is provided that the motor vehicle receives, from the driver via voice control and/or gesture control, setting information relating to a position of the stopped motor vehicle to be established, and adjusts the position of the motor vehicle based on this information. In other words, the driver can transmit to the motor vehicle, via voice control and/or gesture control, setting information which characterizes the position of the motor vehicle in the stopped state to which the driver desires to adjust. The control device adjusts the position of the motor vehicle depending on the setting information, for example. For example, when the need is present the motor vehicle is stopped by the control device at the stopping point and the driver then adjusts the position of the motor vehicle by means of setting information transmitted to the motor vehicle by way of the voice control and/or gesture control, the control device adjusting the position of the motor vehicle using the information. This allows the driver, by means of the voice control and/or the gesture control, to position the motor vehicle at the stopping point in the position that is particularly comfortable for him.

In an advantageous development of the invention, the motor vehicle stores the position to be set on a driver-specific basis depending on the stopping point. In other words, the setting information with respect to the position to be set, which is transmitted by the voice control and/or gesture control, is stored by the motor vehicle and applied to future maneuvering operations related to similar stopping points. The support of the stopping at the stopping point, in the event of necessity, can thus be adapted to the driver's preference with respect to the position of the stopped motor vehicle, even in future stopping operations at the stopping point or at similar stopping points.

In a further advantageous embodiment of the invention, it is provided that the motor vehicle determines at least two stopping points and, depending on an input by the driver which characterizes a first of the stopping points, maneuvers the motor vehicle to the first stopping point by means of the control device and stops at this point depending on the need. This means that the motor vehicle determines the at least two stopping points, determines the respective need for the motor vehicle to stop at the respective stopping points, and if the need is present to stop at at least one of the stopping points, requests from the driver of the motor vehicle input characterizing a first of the stopping points. Depending on the input of the driver characterizing the first of the stopping points, the control device steers the motor vehicle to the stopping point and stops the motor vehicle there. Alternatively, the control device supports the driver of the motor vehicle in maneuvering to the first of the stopping points and stopping the motor vehicle there. For example, when entering a parking garage, the motor vehicle may have to stop at one of several parking ticket machines, so that the driver of the motor vehicle can draw a parking ticket there. In this situation, a proposal can be made to the driver of the motor vehicle as to the different parking ticket machines. For example, an associated waiting time is transmitted from a respective parking ticket machine to the motor vehicle, which the motor vehicle outputs to the driver. Depending on the input by the driver, the control device can maneuver the motor vehicle to the respectively selected parking ticket machine and bring it to a stop at the associated stopping point. The driver thus advantageously has the option of selecting, from a plurality of stopping points where the motor vehicle must stop, respectively, a stopping point at which the vehicle is to stop.

In addition, it has proven to be advantageous if, in a stopped state of the motor vehicle at the stopping point, depending on the stopping point a window is opened by means of the control device and/or an energy-saving measure is activated by means of the control device. For example, when the motor vehicle is stopped at a stopping point that can be associated with the parking ticket machine after stopping the motor vehicle, the window can be opened by the control device so that the driver of the motor vehicle can withdraw a parking ticket from the parking ticket machine in a particularly advantageous and time-saving manner. When the motor vehicle stops at a stop point that can be associated with a train crossing, in particular the barrier device, it is advantageous to activate the energy-saving measure by means of the control device if the duration for the presence of the need is above a defined minimum duration. Consequently, the motor vehicle can be operated particularly energy-efficiently.

A second aspect of the invention relates to a vehicle which is designed to execute a method as has already been described in connection with the method according to the invention. Advantages of the method are also to be regarded as advantages of the motor vehicle according to the invention.

The invention also includes further embodiments of the motor vehicle according to the invention, the embodiments having features such as those previously described in connection with the further embodiments of the method according to the invention. For this reason, the corresponding embodiments of the motor vehicle according to the invention are not described again here.

Figure 2:
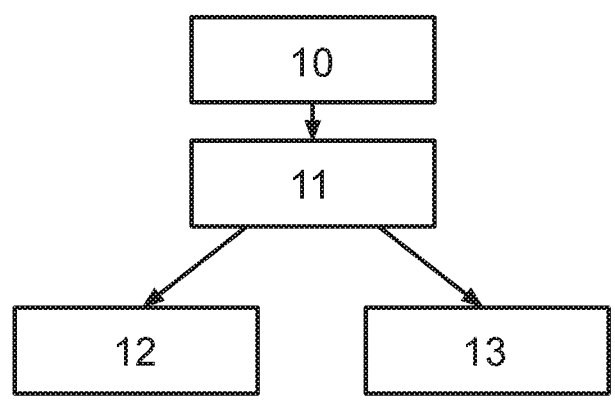
FIG. 2 illustrates a schematic representation of a method for operating the motor vehicle according to FIG. 1, in which the motor vehicle determines the stopping point, a need to stop at the stopping point, and triggers an action of the motor vehicle dependent on the need, according to some embodiments of this disclosure.

Embodiments of the invention are described below. What is shown here is:

FIG. 1 a schematic side view of the motor vehicle, which determines a stopping point for the motor vehicle by means of a sensor device; and FIG. 2 a schematic representation of the method for operating the motor vehicle according to FIG. 1, in which the motor vehicle determines the stopping point, a need to stop at the stopping point, and triggers an action of the motor vehicle dependent on the need.

The embodiments described below are preferred embodiments of the invention. In the embodiments, the described components of the embodiments each constitute individual features of the invention to be considered independently of one another, which also each develop the invention independently of one another, and which, as part of the invention, are therefore also to be considered individually or in a combination different from the depicted combination. In addition, the embodiments described can also be supplemented by further features of the invention already described above.

In the figures, elements with the same function are denoted with the same reference signs.

FIG. 1 shows a motor vehicle 2 located on a roadway 1 in a schematic side view.

The motor vehicle 2 comprises a control device 3, by means of which the motor vehicle 2 is controllable. In addition, the motor vehicle 2 comprises a sensor device 4, by means of which a stopping point 5 for the motor vehicle 2, which is present on the roadway 1, can be determined. In addition, the motor vehicle 2 comprises a detection device 6, by means of which stopping information 7 can be received from a traffic infrastructure component 8, which in the present case is a traffic light arranged next to the roadway 1. The stopping point 5 or the position of the stopping point 5 relative to the roadway 1 may depend on a type of traffic infrastructure component 8. Thus, in an infrastructure component 8 designed as a traffic light, the stopping point 5 is located at a distance from the traffic infrastructure component 8 which is different than the stopping point 5 for a traffic infrastructure component 8 designed as a parking ticket machine.

For another motor vehicle located behind the motor vehicle 2 in the direction of travel 9 and not shown in FIG. 1, an assigned stopping point may be different from the stopping point 5 of motor vehicle 2 and can depend on a position of motor vehicle 2 relative to the other motor vehicle, relative to the traffic infrastructure component 8 and relative to the roadway 1. It has proven to be advantageous if the stopping point that can be assigned to the other motor vehicle is located behind motor vehicle 2 on the roadway 1 in the direction of travel 9 of motor vehicle 2 so that a risk of a collision between the other motor vehicle and motor vehicle 2 is kept particularly low.

In FIG. 2, a method scheme for operating the motor vehicle 2 is shown. In the method, the stopping point 5 for motor vehicle 2 is determined in a first method step 10 by means of the sensor device 4 of motor vehicle 2. In a second method step 11, motor vehicle 2 determines a need to stop at the stopping point 5. When the need 12 exists, motor vehicle 2 stops motor vehicle 2 at the stopping point 5. In the present case, when the need is present 12 the control device 3 maneuvers motor vehicle 2 to the stopping point 5 and stops motor vehicle 2 at the stopping point 5. If the need is absent 13, the control device 3 of motor vehicle 2 carries out a movement of motor vehicle 2 and/or issues a message characterizing that the need is absent 13 to a driver of motor vehicle 2 by means of an output device.

The motor vehicle 2 described in connection with FIGS. 1 and 2 as well as the method for operating motor vehicle 2 described in connection with the method scheme from FIG. 2 are based on the knowledge that networked systems already facilitate contactless payment options and subsequent entry into a parking garage for vehicles, for example through an automatic barrier opening. However, there is currently no assistance for a stopping maneuver and a further driving maneuver per se. Until now, the driver of a vehicle has had to recognize a suitable stopping point and maneuver autonomously to the stopping point 5, for example in order to pay, to pull a ticket, to open a barrier or to open a barrier automatically. In this case, a route to the respective stopping point 5 may have a narrow approach in some places, which may be connected to a tight cornering and/or poor visibility and thus may be difficult to approach for the driver of the vehicle. In places where the driver has to wait a long time, such as at a train crossing, at a barrier, at a bridge, at a ferry port, at a gate with a time-limited entrance or at a garage, the driver has until now been obliged to watch and see when he can continue. However, the driver can become distracted and miss the opportunity to move on or pull a ticket if this was not possible at a previous time.

By means of the method described in connection with FIG. 2 for operating the motor vehicle 2, an approaching and stopping at a correct position, in this case stopping point 5, assisted or automatically started and stopped by means of the control device 3, can be carried out. Here, stopping point 5 can also be determined by its type. A determination as well as a verification of the stopping point 5 can take place with the aid of a fusion of environmental data, such as the stopping information 7 broadcasted by the traffic infrastructure component 8, with sensor data 14 of the sensor device 4. In this case, the sensor device 4 can determine the stopping point 5 by means of a camera system of motor vehicle 2, which is not shown, in comparison with known data sources, in this case high-precision navigation data or infrastructure data of a specific environment of motor vehicle 2, the sensor device receiving said data from a higher-level computing device. In addition, an adaptable automation can take place in that individual settings or preferences of the driver are included in the determination of the stopping point 5. In this case, the control device 3 can include certain criteria of a target person, in this case the driver, which have been collected and stored on a drive-specific basis by the control device 3, in the determination of the stopping point 5. In the present case, this criteria involves a maximum distance from a ticket counter that is acceptable to the respective driver due to a size of the driver or involves other individual needs. In this case, these criteria are read out by the control device 3 from a digital ID, such as a my Audi account or vehicle-specific settings with a personal profile.

An adaptive automation can take place in that motor vehicle 2 uses the sensor device 4 to determine changes of conditions of the specific environment which do not coincide with the stopping information 7 of the traffic infrastructure component 8 and/or the infrastructure data of the specific environment. In the course of adaptive automation, the motor vehicle 2 can adapt an approach path to the stopping point 5 and/or the stopping point 5 in accordance with the sensor data 14.

A manual adjustment of the stopping point 5 can take place in that the driver concretely prescribes and/or retrofits the stopping point 5 via voice commands or voice control in this case. As voice commands, the driver of the motor vehicle can say 2 "closer", "forward", or "occupant rear left pays ticket" or "occupant rear left pulls ticket" to motor vehicle 2. Alternatively or additionally, the driver can control the stopping point 5 by means of gestures, pointing or pressing (touching) an input device on a visualized environment map which is displayed in the motor vehicle 2 on a display or on a digital medium such as a smartphone, a smartwatch or digital data goggles, and can adjust the stopping point 5 or specifically specify it. Alternatively or additionally, it is possible to point to a real location outside the motor vehicle 2 in order to adapt or specify the stopping point 5, wherein the driver can enter a confirmation of the adapted stopping point 5 at the input device. An indication of the adapted stopping point 5 can be embedded in the real environment or displayed on a high-precision map section of the environment map.

In the presence of a plurality of vehicles within a defined radius around motor vehicle 2, cooperative behavior can be taken into account. In steering the plurality of vehicles to the stopping point 5, the plurality of vehicles can coordinate and decide upon their desired stopping positions, for example. In this case, the coordination can be with respect to a temporal order for prioritizing the motor vehicles for picking up tickets at a ticket counter in order to ensure maximum time efficiency or to favor certain vehicles with important people. Alternatively or additionally, the coordination can be carried out with respect to a distribution of the motor vehicles at different stopping points, in the present case to optimize a distribution of the plurality of motor vehicles onto a plurality of lanes on a ferry, thereby evenly distributing a weight of the plurality of motor vehicles on the ferry.

The driver can be informed on the display of a planned stopping strategy present in relation to the time sequence or of a selected stopping point 5 of motor vehicle 2. By facilitating an input by the driver using the input device, the driver can be given a possibility for having an influence, in this case by selecting another stopping point or another prioritization of the sequence. In the present case, the prioritization of the sequence can be changed by payment so that the payment allows the driver to maneuver to the stopping point 5 particularly quickly.

The stopping point 5 can have different properties. For example, the stopping point 5 can be a stopping point at which the driver is to do something from motor vehicle 2 through a car window, in this case make a payment, draw a ticket, press a button or operate a display. Alternatively, the stopping point 5 may be a stopping point at which the driver is to do something outside motor vehicle 2, in the present case to deliver an object, introduce or identify himself personally to a guard, or to pick something up at a drive-in counter to subsequently load motor vehicle 2. Alternatively or additionally, the stopping point 5 may be a stopping point at which the driver must wait until further travel is possible, in this case at a stopping point in front of a barrier, at a train crossing on a rocker bridge or swing bridge or bascule bridge, at a ferry off-ramp or a temporarily closed on-ramp. Moreover, the stopping point 5 may be a stopping point in front of an entrance of a route destination, in this case at the end of a destination navigation, at which a passenger of motor vehicle 2 wants to get off or the motor vehicle 2 is parked autonomously when the route destination is reached.

In cases where motor vehicle 2 stops at the stopping point 5 at which the driver or another occupant of motor vehicle 2 is to perform an action such as pulling a ticket through the car window, the car window opens by means of the control device 3 upon reaching the stopping point 5. At the stopping point 5 at which the driver has to wait, such as the barrier, the driver can be assisted with regard to several aspects. The control device 3 notifies the driver, in good time before reaching the stopping point 5, whether there is a need to stop or whether the motor vehicle 2 can continue, for example because the barrier isn't going to move down for ten more seconds and the driver will already pass through the barrier in eight seconds if he maintains his speed and assuming current flow of traffic. In this case, the driver is at least given a recommendation with respect to his driving behavior in order to avoid a potential waiting time. In this case the driver can be issued the recommendation that "if you maintain 30 kilometers per hour, you can pass the barrier—which closes in ten seconds". If the waiting time at the stopping point 5 is foreseeable, in the present case based on the stopping information 7 received from the traffic infrastructure component 8 by means of the detection device 6 and transmitted to the control device 3, then the control device 3 gives the driver feedback about a duration of the waiting time. In addition, depending on the waiting time, energy-saving measures such as an engine shutdown, a reduction of electricity consumers and/or a display of a battery management are activated by the control device 3 or a suggestion is given to the driver for activation. At the end of the waiting time, the control device 3 issues driving instructions to the driver of motor vehicle 2, the instructions characterizing that it is possible to continue driving shortly. This can be done by ending an engine stop phase, turning an engine on, vibrating a driver's seat or providing the driver with an optical signal by means of the display which the driver can perceive particularly even if he is distracted. Depending on the driver's level of attention or ability to assume control, motor vehicle 2 can be started or initiated by the control device 3. Alternatively or additionally, motor vehicle 2 can be jolted using the control device 3, which is intended to wake up an inattentive driver.

Overall, the examples show how the invention can provide stopping assistance to a driver of motor vehicle 2 at gates, toll stations or ferries.

The invention claimed is:
1. A method for operating a motor vehicle, the method comprising:
   exchanging driving information with at least one other motor vehicle;
   receiving stopping information from a traffic infrastructure component;
   determining a stopping point for the motor vehicle using a sensor device of the motor vehicle and as a function of the driving information, wherein a position of the stopping point with respect to the traffic infrastructure component depends on a type of the traffic infrastructure component, and wherein stopping operations of the motor vehicle and the at least one other motor vehicle are coordinated with one another by way of the exchanging driving information between the motor vehicle and the at least one other motor vehicle;

receiving, from a driver of the motor vehicle and using voice control or gesture control, setting information relating to the stopping point;

adjusting the stopping point for the motor vehicle based on the setting information;

determining a need to stop at the stopping point;

in response to determining that the need to stop is present, causing the motor vehicle to stop at the adjusted stopping point; and in response to determining that the need to stop is absent, carrying out, using a control device of the motor vehicle, a movement of the motor vehicle or issuing a message characterizing an absence of the need to stop to the driver.

2. The method according to claim 1, further comprising:
maneuvering, using the control device, the motor vehicle to the stopping point in response to determining that the need to stop is present; and
stopping the motor vehicle at the adjusted stopping point.

3. The method according to claim 1, further comprising:
determining the stopping point or the need to stop at the stopping point based on the stopping information.

4. The method according to claim 3, further comprising:
determining a time and duration for the need to stop based on the stopping information; and
outputting the time and the duration to the driver.

5. The method according to claim 1, further comprising:
storing a position of the adjusted stopping point based on the stopping point in a driver-specific manner.

6. The method according to claim 1, further comprising:
determining at least two stopping points;
depending on an input by the driver which characterizes a first of the at least two stopping points, maneuvering the motor vehicle to the first of the at least two stopping points using the control device; and
stopping at the first of the at least two stopping points in response to determining that the need to stop is present.

7. The method according to claim 1, further comprising:
opening a window using the control device in a stopped state of the motor vehicle at the adjusted stopping point and based on the stopping point.

8. The method according to claim 1, further comprising:
activating an energy-saving measure using the control device in a stopped state of the motor vehicle at the adjusted stopping point and based on the stopping point.

9. A motor vehicle, comprising:
a sensor device; and
a control device configured to:
exchange driving information with at least one other motor vehicle;
receive stopping information from a traffic infrastructure component;
determine a stopping point for the motor vehicle using the sensor device and as a function of the driving information,
wherein a position of the stopping point with respect to the traffic infrastructure component depends on a type of the traffic infrastructure component, and
wherein stopping operations of the motor vehicle and the at least one other motor vehicle are coordinated with one another by way of the exchanging driving information between the motor vehicle and the at least one other motor vehicle;
receive, from a driver of the motor vehicle and using voice control or gesture control, setting information relating to the stopping point;
adjust the stopping point for the motor vehicle based on the setting information;
determine a need to stop at the stopping point;
in response to determining that the need to stop is present, cause the motor vehicle to stop at the adjusted stopping point; and
in response to determining that the need to stop is absent, carry out a movement of the motor vehicle or issue a message characterizing an absence of the need to stop to the driver.

10. The motor vehicle according to claim 9, wherein the control device is further configured to:
maneuver the motor vehicle to the stopping point in response to determining that the need to stop is present; and
stop the motor vehicle at the adjusted stopping point.

11. The motor vehicle according to claim 9, wherein the control device is further configured to:
determine the stopping point or the need to stop at the stopping point based on the stopping information.

12. The motor vehicle according to claim 11, wherein the control device is further configured to:
determine a time and duration for the need to stop based on the stopping information; and
output the time and the duration to the driver.

13. The motor vehicle according to claim 9, wherein the control device is further configured to:
store a position of the adjusted stopping point based on the stopping point in a driver-specific manner.

14. The motor vehicle according to claim 9, wherein the control device is further configured to:
determine at least two stopping points;
depending on an input by the driver, which characterizes a first of the at least two stopping points, maneuver the motor vehicle to the first of the at least two stopping points; and
stop at the first of the at least two stopping points in response to determining that the need to stop is present.

15. The motor vehicle according to claim 9, wherein the control device is further configured to:
open a window in a stopped state of the motor vehicle at the adjusted stopping point and based on the stopping point.

16. The motor vehicle according to claim 9, wherein the control device is further configured to:
activate an energy-saving measure in a stopped state of the motor vehicle at the adjusted stopping point and based on the stopping point.

* * * * *